United States Patent [19]

Ledding

[11] 4,237,619
[45] Dec. 9, 1980

[54] FLUIDIZED BED APPARATUS

[75] Inventor: Willard E. Ledding, Clarendon Hills, Ill.

[73] Assignee: CPC International Inc., Englewood Cliffs, N.J.

[21] Appl. No.: 970,069

[22] Filed: Dec. 15, 1978

[51] Int. Cl.³ ............................................. F26B 17/00
[52] U.S. Cl. ...................................... 34/57 R; 34/10; 406/118; 406/164; 432/14; 432/58
[58] Field of Search ............ 34/10, 57 R, 57 A, 57 B, 34/57 C, 57 E; 432/14, 58; 406/118, 124, 134, 164

[56] References Cited

U.S. PATENT DOCUMENTS

| | | | |
|---|---|---|---|
| 3,233,336 | 2/1966 | Oldweiler et al. | 34/57 R |
| 3,349,500 | 10/1967 | Wall | 34/10 |
| 3,967,975 | 7/1976 | Idaszak | 34/10 X |
| 4,021,927 | 5/1977 | Idaszak | 34/10 |
| 4,106,210 | 8/1978 | Jukkola | 34/57 R |

*Primary Examiner*—John J. Camby
*Attorney, Agent, or Firm*—Stanley M. Parmerter

[57] ABSTRACT

A process and apparatus for fluidized bed operations wherein the fluidized bed includes an upper fluidized zone and a lower fluidized zone, with each of the upper and lower fluidized zones equipped with agitating means therein. Positioned intermediate the upper and lower fluidized zones are a plurality of tubular zones. Substantially parallel to the fluidized zones is a discharge leg positioned to receive fluidized solids from the lower fluidized zone in which the fluidized solids are fluidized in the leg at a level substantially equal to the level of fluidized solids in the upper zone whereby a portion of the solids can be removed from a repositionable discharge means in the discharge leg. The process involved in this invention utilizes a fluidized system for starch drying wherein the moisture content of the starch supplied to the fluidized bed is controlled to a level not exceeding 27% whereby the fluidized bed can be operated at higher temperatures without damaging the starch.

6 Claims, 3 Drawing Figures

FLUIDIZED BED APPARATUS

BACKGROUND OF THE INVENTION

This invention relates to fluidization, and more particularly to apparatus and process for carrying out fluidized bed operations.

Fluidized beds have been used for many years in the chemical industry for carrying out a wide variety of chemical reactions and/or unit operations. One of the primary advantages of fluidized bed systems arises from the fact that the high turbulence created in the bed provides high heat transfer characteristics as well as complete mixing of the solids and gases within the bed itself.

One of the primary disadvantages of fluidized bed systems is the phenomenon known as channeling whereby gas pockets are formed within the solids phase such that gases travel through the fluidized bed without intimately contacting the solid phase. That has been a particularly severe problem in the art in the fluidization of solid phases which have been recognized as difficult to fluidize, notably starch.

Significant improvements in the fluidization of solids which are difficult to fluidize have been achieved through the use of fluidization processes and apparatus as described in U.S. Pat. Nos. 3,967,975 and 4,021,927, the disclosures of which are incorporated herein by reference. The fluidized bed system utilized in those two patents comprises three distinct fluidized zones, an upper and lower fluidized zone, each of which is provided with paddle-type agitators to promote more complete mixing. Each of the upper and lower fluidized zones communicates each with the other by means of a plurality of tubular zones surrounded by heat transfer media whereby most, if not all, of the heat transfer to or from the fluidized bed is passed through the walls of the tubular fluidized zones.

The present invention is an improvement over the process and apparatus described in the foregoing patents, including improved means to discharge fluidized solids from the reactor and an improved process for use of the equipment in the drying of starch.

OBJECTS OF THE INVENTION

It is accordingly an object of the invention to provide improved apparatus for the discharge of fluidized solids from a fluidized bed system.

It is a more specific object of this invention to provide improved discharge means for fluidized bed systems obviating the need for the rotary airlocks of the sort used by the prior art, and which is capable of controlling the bed level in the upper fluidized zone of the fluidized bed.

It is yet another object of this invention to provide an improved process for the drying of starch in a fluidized bed system of the type described above wherein the capacity and efficiency of the bed are increased, and the operating costs of the fluidized system are decreased.

These and other objects and advantages of the invention will appear more fully hereinafter, and, for purposes of illustration but not of limitation, an embodiment of the invention is shown in the accompanying drawings as described hereinafter.

SUMMARY OF THE INVENTION

The present invention is directed to fluidization of solid materials, particularly solid particulate materials which have a tendency to adhere to agglomerate. Apparatus of the present invention is useful in chemical and/or physical processes in which such particulate materials are fluidized and subjected to heat transfer during fluidization, usually to supply heat to the particulate material.

In accordance with one embodiment of the invention, the improved apparatus includes a fluidization system comprising an upper agitated fluidized zone and a lower agitated fluidized zone with an intermediate fluidized zone formed of a plurality of tubular zones communicating with each of the upper and lower fluidizing zones whereby fluidizing gas is passed upwardly through the lower agitated fluidized zone, through the intermediate zone and into the upper agitated fluidized zone to fluidize the solids in each of the three zones. The improvement afforded by way of this invention resides in a discharge means comprising a substantially vertical fluidized zone or leg substantially parallel to the foregoing three zones, including means for supplying a fluidizing medium near the base and means for removing fluidized solids at a level above the base of the parallel zone.

In the practice of the invention, fluidized solids are transported from the upper or lower fluidized zones, preferably the former, to the discharge leg in which they are fluidized by means of the fluidizing gas supplied at the base thereof. Solid particulate matter is removed from outlet means provided in the leg, the outlet means being repositionable, if desired, to establish the level of fluidized solids in the upper fluidized zone.

Thus, using the discharge system of this invention, fluidized solids are removed from the fluidized zone through the discharge leg and the outlet means provided therein without the necessity of employing rotary airlocks of the type frequently used in prior art fluidized systems. The discharge system of the invention has the further advantage in that it can be positioned at a level which can determine the level of fluidized solids in the upper agitated fluidized zone.

Alternatively, the discharge leg can be operated at levels different from the level of fluidized solids in the upper fluidized zone. Thus, the flow of fluidizing gas into the discharge leg can be varied so that, for a given height of solids in the upper fluidized zone, any desired height in the discharge leg can be achieved by control of fluidizing gas to the leg.

In accordance with another embodiment of the invention, there is provided a process for utilizing apparatus of the type described in the drying of starch. It has been found that where starch supplied to the fluidized system described above is controlled so as to have a moisture content not exceeding twenty-seven percent moisture by weight, the fluidized bed system can be operated at higher temperatures and exit-gas wet-bulb temperatures without appreciably damaging the starch. It is therefore preferred, when processing starch produced from wet milling, in the form of a centrifuge-cake having a moisture content ranging from about twenty-eight to forty-five percent by weight, to recycle dried starch for blending with the centrifuge-cake starch. The amount of the recycled, dry starch (having a moisture content below nineteen percent by weight) is adjusted so that the total moisture content of the starch supplied to the fluidized bed dryer does not exceed twenty-seven percent by weight.

DESCRIPTION OF THE PREFERRED EMBODIMENT

Figures 1, 2:
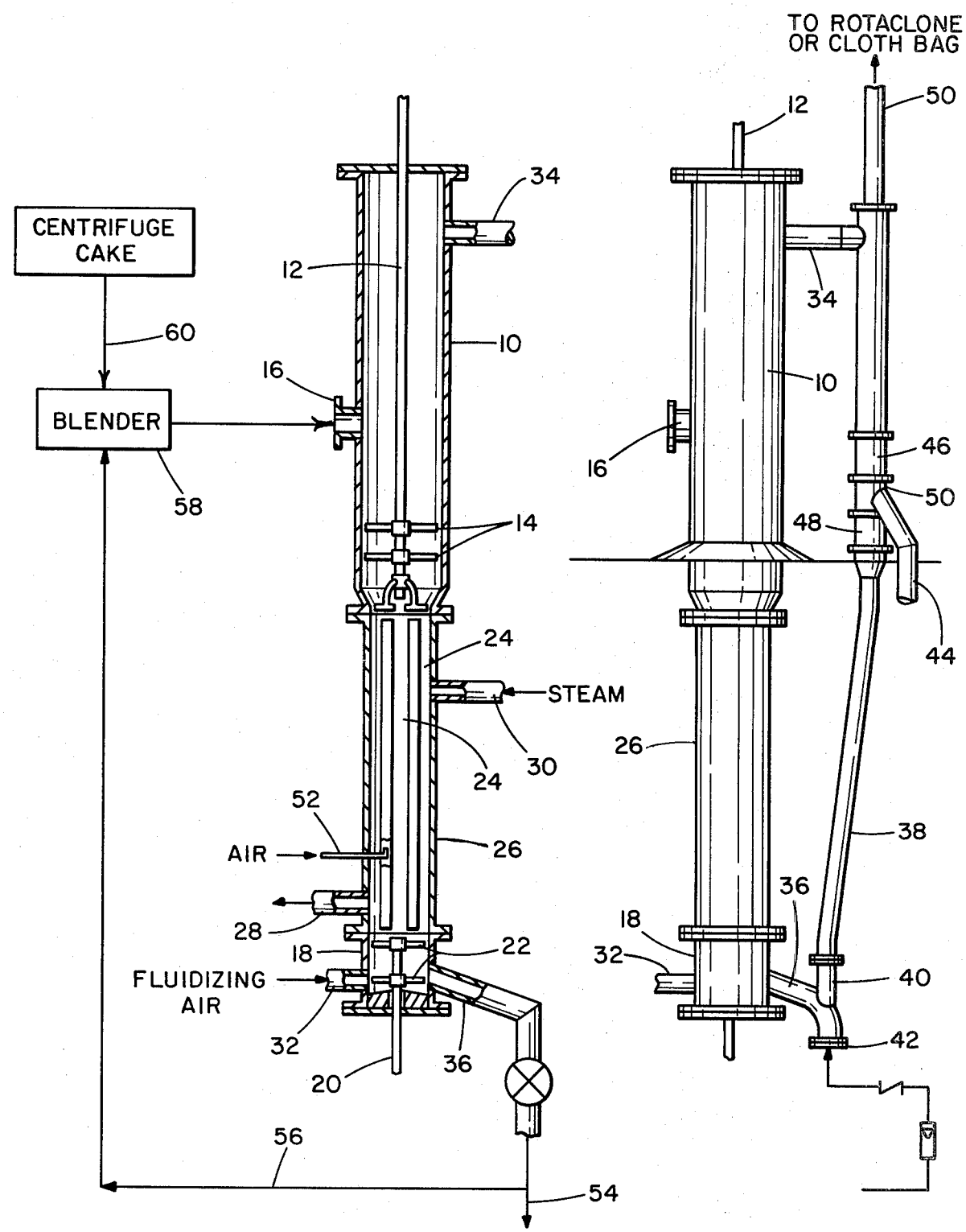
FIG. 1 is a sectional view of a fluidized bed reactor suitable for use in the process of the invention.
FIG. 2 is a view in elevation of the fluidized bed system illustrated in FIG. 1, equipped with an airlift-leg discharge system.

In accordance with one embodiment of the invention, the concepts of the invention reside in an improved discharge system for fluidized bed reactors of the type described in U.S. Pat. Nos. 3,967,975 and 4,021,927. Referring now to FIG. 1 of the drawings, there is shown a fluidized bed system of the type described in those patents including an upper fluidized zone 10 having an axially-extending agitator shaft positioned therein. Mounted on the shaft 12 are a plurality of agitator blades 14 to facilitate mixing within the upper fluidized zone 10. Also provided in the upper fluidized zone is an inlet supply port 16 through which the material to be fluidized is supplied.

Positioned below the upper fluidized zone 10 is a lower fluidized zone 18, also equipped with an agitator shaft 20 and a plurality of mechanical agitators 22 mounted therein to permit mixing within the lower fluidized zone 18. As those skilled in the art will appreciate, the agitators in both the upper and lower fluidized zones 10 and 18 are driven by suitable motors or like driving means, not illustrated in the drawing.

Positioned intermediate of the upper and lower fluidized zones 10 and 18 are a plurality of tubular fluidized zones 24 communicating with both the upper fluidized zone 10 and the lower fluidized zone 18. The intermediate or tubular fluidized zones 24 are preferably equipped with a jacket 26 surrounding the tubes 24 so that a suitable heat exchange medium such as steam can be supplied to the inlet port 30 and the discharge port 28 to supply heat (or to remove it) from the tubular zones 24. As is described in the foregoing patents, the tubular zones 24 have a cross-sectional area which is significantly smaller than the cross-sectional area of either the upper or lower fluidized zones 10 or 18, respectively. Fluidizing air is thus supplied to the lower fluidizing zone 18 by means of a suitable inlet port 32 in accordance with any of a variety of techniques known to the art.

Thus, in the use of the fluidized system of FIG. 1, the solid particulate matter to be fluidized is introduced, preferably at the supply port 16 and fluidizing gas is supplied to the inlet port 32 in the lower fluidizing zone 18. The fluidizing gas supplied to the lower fluidizing zone 18 thus serves to fluidize the solids present in the lower fluidized zone 18, the tubular zones 24 and the upper fluidized zone 10. The fluidizing gas is thus removed from a port 34 near the top of the upper fluidized zone 10 for passage to a cyclone separator or the like in accordance with conventional techniques. The fluidized solids can be, where desired, removed, in the embodiment shown in FIG. 1, through a discharge port 36 communicating with the interior of the lower fluidized zone 18.

FIG. 2 illustrates the improved airleg-leg discharge system from one concept of this invention, the fluidized bed system of FIG. 2 being the same as that shown in FIG. 1 including the upper fluidizing zone 10, the lower fluidized zone 18, and the jacket 26 enclosing the intermediate tubular zone (the tubular zones 24 are not visible in FIG. 2) by the discharge means includes an elongate tubular fluidized zone 38 which extends vertically, substantially parallel, to the upper and lower fluidized zones 10 and 18 as well as the intermediate tubular fluidized zones 24. At its lower end 40, the airlift discharge leg 38 communicates with the discharge port 36, and at its upper end, communicates with the fluidizing gas exhaust port 34.

In this embodiment, the discharge port 36 includes a plenum chamber 42 to which a fluidizing gas, such as air, is supplied. The airlift discharge leg also includes an adjustable discharge port 44, the level of which can be varied depending on the system to be fluidized. For this purpose, a section of the airleg discharge tube 38 is provided with a plurality of collars 46, 48 and 50, one of which (collar 50) carries the discharge port 44. When it is desired to, for example, increase the level at which the discharge port 44 is positioned on the airleg discharge tube 38, the collars 46 and 50 can be removed and their position reversed so that the collar 50, carrying the discharge port 44, is positioned at a level above the collar 46. By the same token, when it is desired to lower the discharge port 44, the relative positions of collars 50 and 48 are simply reversed so that the discharge port 44 is positioned at a level lower than that shown in FIG. 2.

In the use of this embodiment, fluidizing gas is supplied to the plenum chamber 42 only or to the plenum chamber and the fluidizing gas inlet port 32 simultaneously. The fluidizing gas thus supplied serves to fluidize the solids in both the upper and lower zones 10 and 18 as well as the intermediate tubular fluidized zones 24 and the airlift discharge leg 38. Thus, the solids to be fluidized are supplied to the inlet supply port 16 and are fluidized within the upper fluidized zone 10, the intermediate tubular fluidized zones 24, and the lower fluidized zone 18, from which they pass into the discharge port 36. The particulate solids which are passed downwardly through the fluidized bed system pass through the discharge port 36, but are lifted, by means of the fluidizing gas supplied to the plenum chamber 42, into the airleg discharge tube 38 where a solids level is established corresponding to that in the fluidized zone 10. The particulate solids which may be above the level of the fluidized bed in the upper fluidized zone 10 are passed downwardly through the discharge port 44 for recovery. Thus, the elevation of the discharge port 44 on the airlift leg discharge tube 38 in combination with the flow rate of the fluidizing gas in the leg 38 determines the level of fluidized solids in the upper fluidized zone 10. Fluidizing gas passing through the airlift leg discharge tube 38 is permitted to exit through the fluidizing gas discharge port 50 for passage to a cyclone or the like, either with or without the fluidizing gas supplied to inlet 32, the latter being discharged via exit port 34.

Thus, the use of the airleg discharge tube as illustrated obviates the need for a rotary airlock of the type employed by the prior art, while providing the further advantage of fixing the level of fluidized solids in the upper fluidized zone 10. In addition, the discharge leg enables the product to be elevated to significant heights.

When using fluidized bed systems of the type described above in the drying of starch, the upper and lower agitated zones serve to prevent channeling of the starch and hence improve efficiency in the drying operation. However, substantially all of the heat supplied to the system is supplied by means of the heat exchange media introduced to the jacket 26 surrounding the plurality of fluidized zones, each of which have a cross-sectional area significantly less than the cross-sectional area of either the upper and lower fluidized zones.

It is an important concept of this invention, when utilizing a fluidized bed system of the type described for the drying of starch, to maintain the moisture content of the starch supplied to the fluidized bed system below twenty-seven percent by weight moisture. As those skilled in the art appreciate, it is desirable to operate a fluidized bed dryer at the highest possible temperature, both from the standpoint of energy conservation and reduction in exit-gas volumes (subject to particulate clean-up for pollution control). It has been found, however, when centrifuge cake is dried in a fluidized bed dryer and the wet-bulb temperature of the exit gas stream is high (i.e., greater than about 57° C. wet-bulb), the starch recovered from the dryer does undergo damage, manifesting itself as an increase in the viscosity of an alkaline slurry of the starch and by significant increases of percent gelatinized starch granules. To avoid that problem, the heat supplied to the bed and the temperature of the inlet air must be reduced to give a wet-bulb temperature of the exit gases of less than about 57° C. In order to maintain the same drying capacity, the air volume supplied to the dryer must be increased, thereby increasing energy and power costs.

It has been unexpectedly found that, when the starch supplied to the fluidized bed dryer contains no more than twenty-seven percent moisture, the fluidized dryer can be operated at significantly higher temperatures such that the wet-bulb temperature of the exit gas is above about 57° C., all without damage to the starch.

In accordance with the practice of this invention, starch having a moisture content of twenty-eight percent or more is blended with dried starch which is recycled from the fluidized bed dryer, with the amount of the dried starch being adjusted so that the moisture content of the starch blend is twenty-seven percent or less, is supplied to a fluidized bed reactor of the sort shown in FIG. 1 or FIG. 2. The dryer is then operated at a temperature such that the wet-bulb temperature of the exit gases is above 54° C., and preferably 60°–95° C. Because the moisture level of the starch is twenty-seven percent or below, the elevated temperatures used in the fluidized dryer serve to minimize operating costs while increasing dryer capacity without any significant damage to the starch.

In the preferred practice of the invention, the starch to be dried is a cake obtained from centrifuging in the conventional starch wet milling process, and contains from about twenty-eight to forty-five percent moisture by weight. That wet starch is thus blended with starch obtained as produced from the dryer by way of a recycle of a portion of the dried starch product. The dried starch recovered as produced from the dryer generally has a moisture content ranging from about two to nineteen percent moisture by weight, depending somewhat on the desired use for the dried starch.

Referring to FIG. 1, the dried starch can be removed from the discharge port 36, and a portion recovered from line 54. Another portion is recycled via line 56 for passage to a blender 58 to which centrifuge cake is supplied by line 60 to make up the supply of starch having a moisture content of twenty-seven percent or below.

In the FIG. 2 embodiment, a similar type of procedure is used, except that the dried starch is removed through the discharge port 44 in the airlift-leg discharge port 38, and a portion recycled for blending with centrifuge cake to provide the desired starch make-up for drying. The latter, as described above, is fed to the upper fluidized zone 10 through inlet port 16.

As will be appreciated by those skilled in the art, the improved drying process described above can be carried out in apparatus other than that described in FIGS. 1 and 2. For example, the starch may be dried using the principles of the process of this invention in a conventional fluidized bed dryer, although such conventional dryers are not as effective by reason of the channeling phenomenon and the difficulty in fluidizing the wet starch.

Having described the basic concepts of the invention, reference is now made to the following examples which are provided by way of illustration and not by way of limitation, of the practice of this invention.

EXAMPLE 1

This example illustrates the use of a fluidized bed dryer having the configuration shown in FIG. 2 of the drawing in the drying of starch.

Several different runs were made utilizing starch having various moisture contents, ranging from a low of about 21% to a high of about 27% moisture by weight. In each instance, a portion of the dried starch recovered from the fluidized bed system was recycled and blended with centrifuge cake starch having a moisture content varying between 30–35% moisture by weight.

The operating conditions used in the various runs are shown in the following table.

| Test No. | Moisture, %* Supply | Moisture, %* Product | Supply Rate (kg/min) | Steam Pressure (kg/cm²) | Air Rate (cfm) | Exit Air Conditions** Td (°C.) | Exit Air Conditions** Tw (°C.) | Exit Air Conditions** R.H. (%) | Avg. Bed Temp. (°C.) | Condition Of Product Alkaline Sensitivity (cp) |
|---|---|---|---|---|---|---|---|---|---|---|
| A | 21.0 | 8.3 | 1.6 | .35 | 35.3 | 93 | 66 | 32 | 85 | 15 |
| B | 22.6 | 10.6 | 2.1 | 1.8 | 22 | 84 | 75 | 69 | 80 | 19 (Feed 16) |
| C | 23.0 | 5.6 | 1.6 | 7.0 | 33 | 104 | 78 | 36 | 100 | |
| D | 23.2 | 6.2 | 3.8 | 10.4 | 28.3 | 109 | 84 | 40 | 109 | 18 (Feed 13) |
| E | 25.2 | 4.2 | 3.4 | 10.4 | 27 | 113 | 84 | 34 | 112 | |
| F | 23.0 | 4.5 | 3.4 | 10.3 | 30 | 108 | 83 | 39 | 102 | |
| G | 21.1 | 11.5 | 5.7 | 10.3 | 26 | 93 | 83 | 68 | 93 | 19 |
| H | 25.0 | 11.3 | 6.6 | 10.4 | 37 | 91 | 81 | 68 | 91 | 21 |
| I | 22.6 | 8.6 | 5.1 | 10.3 | 35 | 100 | 83 | 52 | 100 | 14–16 |

-continued

| Test No. | Moisture, %* Supply | Moisture, %* Product | Supply Rate (kg/min) | Steam Pressure (kg/cm²) | Air Rate (cfm) | Exit Air Conditions** Td (°C.) | Exit Air Conditions** Tw (°C.) | Exit Air Conditions** R.H. (%) | Avg. Bed Temp. (°C.) | Condition Of Product Alkaline Sensitivity (cp) |
|---|---|---|---|---|---|---|---|---|---|---|
| J | 22.6 | 11.1 | 5.7 | 10.3 | 35 | 95 | 83 | 60 | 92 | |
| K | 22.7 | 8.1 | 2.7 | 3.0 | 28 | 100 | 76 | 38 | 105 | |
| L | 32.2 | 10.6 | 3.3 | 10.2 | 34.5 | 100 | 82 | 52 | 99 | Pasted |

*The moisture content of the supply refers to the moisture content of the starch after blending of the dried starch with centrifuge cake starch, whereas the moisture content of the product refers to the moisture content of the material recovered from the fluidized bed system.
**Td refers to dry-bulb temperature and Tw refers to wet-bulb temperature. R.H. signifies relative humidity.

As can be seen from the foregoing table, all of the tests, except test L, utilized a starch having a moisture content of 27% or below. The condition of the starch, from the standpoint of damage, is measured by the alkali sensitivity test in which a solution of 150 ml of 1% by weight sodium hydroxide solution in 50 ml of distilled water is stirred vigorously with an electric stirrer. Then 88 g dry basis of starch is added in 5 to 6 seconds to the vortex of the stirred solution. Stirring is continued for 5 minutes. The viscosity of the solution is measured immediately using a Brookfield viscometer, models RVT or RVF with a No. 1 spindle at 20 rpm. The reading in centipoises (cp) is taken after running the viscometer for 20 seconds.

In each of tests A–K in which dried starch was blended with centrifuge cake to reduce the overall moisture content of the feeder, alkali sensitivity was generally below 21 cp, reflecting minimal starch damage. In test L, however, the starch contacted with the alkali solution in the alkali sensitivity test was totally pasted, indicating extensive starch damage.

These tests demonstrate that the use of the blending of the centrifuge cake with a dried starch to provide a starch supply having a moisture level of about 27% or below permits the fluidized system to be operated under conditions in which the wet-bulb temperature of the exit air is considerably higher, while, at the same time, preventing or substantially minimizing starch damage.

By way of a further improvement, it is sometimes desirable to assist or facilitate the flow of starch upwardly in the tubular zones 24 so that the starch passes upwardly therethrough into the upper fluidized zone 10, where it is believed that much of the drying actually takes place. One suitable technique is to provide, as shown in FIG. 1 of the drawing, an air inlet tube 52 to inject air into one or more of the tubular zones 24. Without limiting this embodiment as to theory, it is believed that the air injection tube 52 serves to transport a greater volume of hot dried starch from the tubular zones 24 to the upper fluidized zones 10 to facilitate the overall drying operation.

Figure 3:
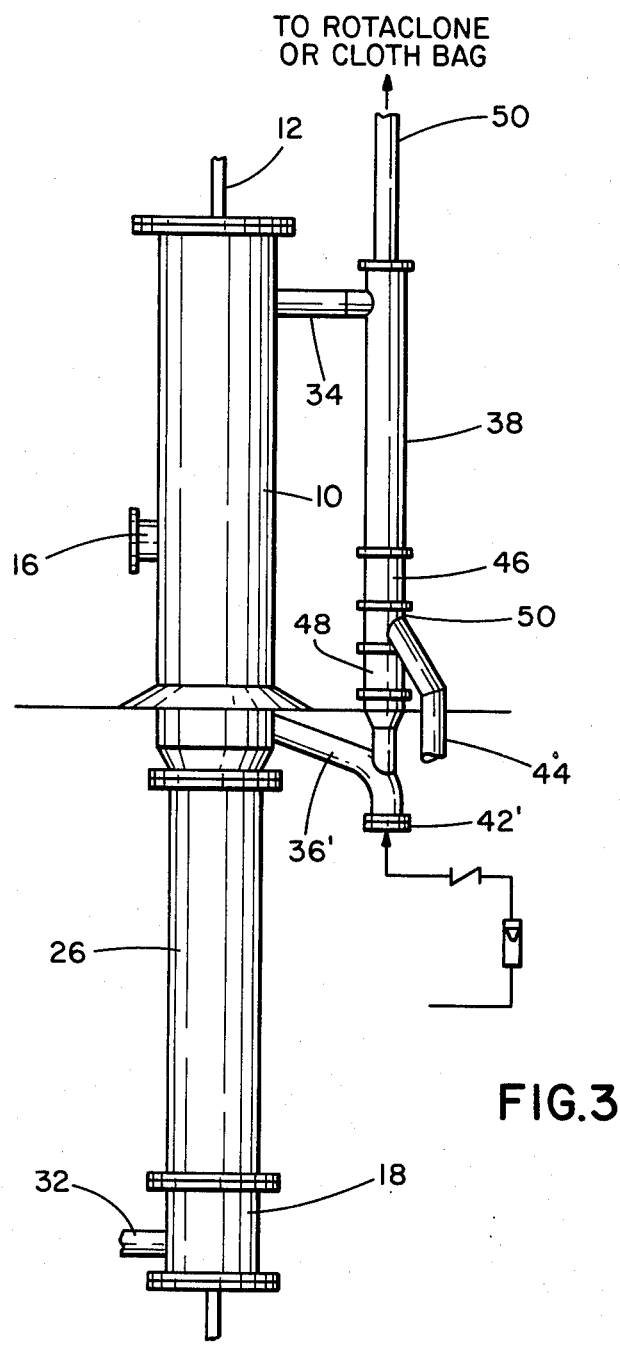
FIG. 3 is a view in elevation of the fluidized bed system illustrated in FIG. 1, equipped with an alternative airlift-leg discharge system.

An alternative embodiment of the invention is shown in FIG. 3 of the drawing, which illustrates a modified airlift discharge system. In working with the airlift discharge leg as depicted in FIG. 2 of the drawing for application in the drying of starch, it was discovered that starch, having somewhat higher moisture contents (e.g., above about 12% moisture by weight), was difficult to remove from the discharge leg 38 when the starch supplied to it came from the lower fluidized zone through discharge port 36. It has been discovered that whenever starch of a higher moisture content is desired, it is sometimes preferable to modify the airlift discharge leg 38 so that the starch supplied to it flows from the upper fluidized zone 10 to the airlift discharge leg tube 38 as illustrated in FIG. 3, rather than from the lower fluidized zone 18 as illustrated in FIG. 2. The airlift leg discharge system is otherwise the same and operates in the same manner. The only major difference is that the discharge port 36' permits the flow of starch from the upper fluidized zone 10 to the lower portion of the discharge leg 38 as illustrated in FIG. 3.

It will be understood that various changes and modifications can be made in the details of construction, procedure and use without departing from the spirit of the invention, especially as defined in the following claims.

I claim:

1. Apparatus for carrying out fluidized operations comprising:
   (a) an elongate upstanding housing defining
      (1) an upper fluidized chamber and a lower fluidized chamber, with both the upper and lower fluidized chambers including mechanical agitating means therein, and
      (2) a plurality of open-ended tubes positioned intermediate of the upper and lower chamber and communicating therewith;
   (b) inlet means to supply a fluidizable material to the upper fluidized chamber;
   (c) means to supply a fluidizing fluid to the lower fluidized chamber whereby the fluid passes upwardly through the lower fluidized chamber, the tubes and the upper chamber to maintain the fluidizable material therein in a fluidized state;
   (d) discharge means including (1) a generally upstanding leg, (2) means to supply fluidizing fluid to said leg, (3) means to supply fluidizable material from one of said fluidized chambers to said leg whereby the fluidizing fluid supplied to said leg serves to fluidize the fluidizable material therein, and (4) means mounted in said leg to remove fluidizable material therefrom;
   (e) means in the upper chamber to remove fluidizing fluid therefrom, wherein the means to remove fluidizing fluid communicates with said leg, and said leg includes means to remove fluidizing fluid therefrom.

2. Apparatus as defined in claim 1 wherein the mechanical agitating means includes a plurality of rotatable agitator blades mounted in each of the upper and lower chambers.

3. Apparatus as defined in claim 1 which includes heat transfer means surrounding the plurality of tubes.

4. Apparatus as defined in claim 1 wherein the cross-sectional area of each of the tubes is less than the cross-sectional area of each of the upper and lower chambers.

5. Apparatus as defined in claim 1 wherein the leg is formed with a plurality of removable sections, with one of the removable sections including a discharge tube for the removal of fluidizable material.

6. Apparatus as defined in claim 1 which includes means to inject a fluidizing fluid into one or more of said tubes to assist in the transport of the fluidizable material therein.

* * * * *